(12) United States Patent
Blanchard et al.

(10) Patent No.: US 8,708,280 B2
(45) Date of Patent: Apr. 29, 2014

(54) TELESCOPIC STRUT

(75) Inventors: Jack Blanchard, Bristol (GB); Andreas Yiasoumi, Bristol (GB)

(73) Assignee: Airbus Operations Limited, Bristol (GB)

( * ) Notice: Subject to any disclaimer, the term of this patent is extended or adjusted under 35 U.S.C. 154(b) by 75 days.

(21) Appl. No.: 13/159,475

(22) Filed: Jun. 14, 2011

(65) Prior Publication Data
US 2011/0303792 A1    Dec. 15, 2011

(30) Foreign Application Priority Data

Jun. 15, 2010  (GB) .................................. 1009970.3

(51) Int. Cl.
*B64C 1/06*    (2006.01)
(52) U.S. Cl.
USPC .......................................................... 244/131
(58) Field of Classification Search
USPC .................................. 244/131, 134 C, 134 D
See application file for complete search history.

(56) References Cited

U.S. PATENT DOCUMENTS

| 2,209,912 | A | * | 7/1940 | Deems | 174/75 B |
| 3,965,526 | A | * | 6/1976 | Doubleday | 15/377 |
| 4,589,662 | A | * | 5/1986 | Robaldo | 473/522 |
| 4,894,020 | A | * | 1/1990 | Holden et al. | 439/191 |
| 7,677,499 | B2 | * | 3/2010 | Weaver | 244/131 |
| 7,883,337 | B2 | * | 2/2011 | Teague | 439/32 |
| 2001/0038058 | A1 | * | 11/2001 | Gleine et al. | 244/198 |
| 2006/0038088 | A1 | * | 2/2006 | Dodson | 244/214 |
| 2008/0078879 | A1 | * | 4/2008 | Weaver | 244/131 |

FOREIGN PATENT DOCUMENTS

| WO | 2006027623 A1 | 3/2006 |
| WO | 2008139213 A1 | 11/2008 |

OTHER PUBLICATIONS

UKIPO Search Report for GB1009970.3, dated Sep. 10, 2010.

* cited by examiner

*Primary Examiner* — Tien Dinh
*Assistant Examiner* — Justin Benedik
(74) *Attorney, Agent, or Firm* — Lowe Hauptman & Ham, LLP

(57) ABSTRACT

A telescopic strut for electrically connecting a fixed structure of an aircraft to a movable structure mounted to the fixed structure, wherein the strut is adapted to be mechanically connected to the fixed structure by its one end and to be mechanically connected to the movable structure by its opposite end, the strut comprising a plurality of telescopic elements and containing a helically coiled electrical cable, wherein the cable is adapted to move between retracted and extended positions with the telescoping of the strut. Also, a method of operating an aircraft having a movable structure mounted to a fixed structure, and one or more of the telescopic struts mechanically and electrically connected between the fixed and movable structures.

27 Claims, 3 Drawing Sheets

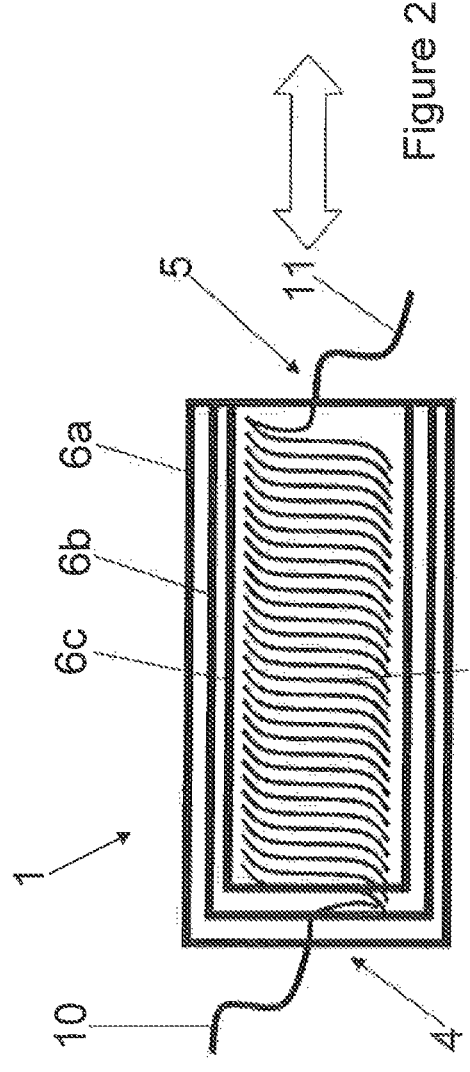
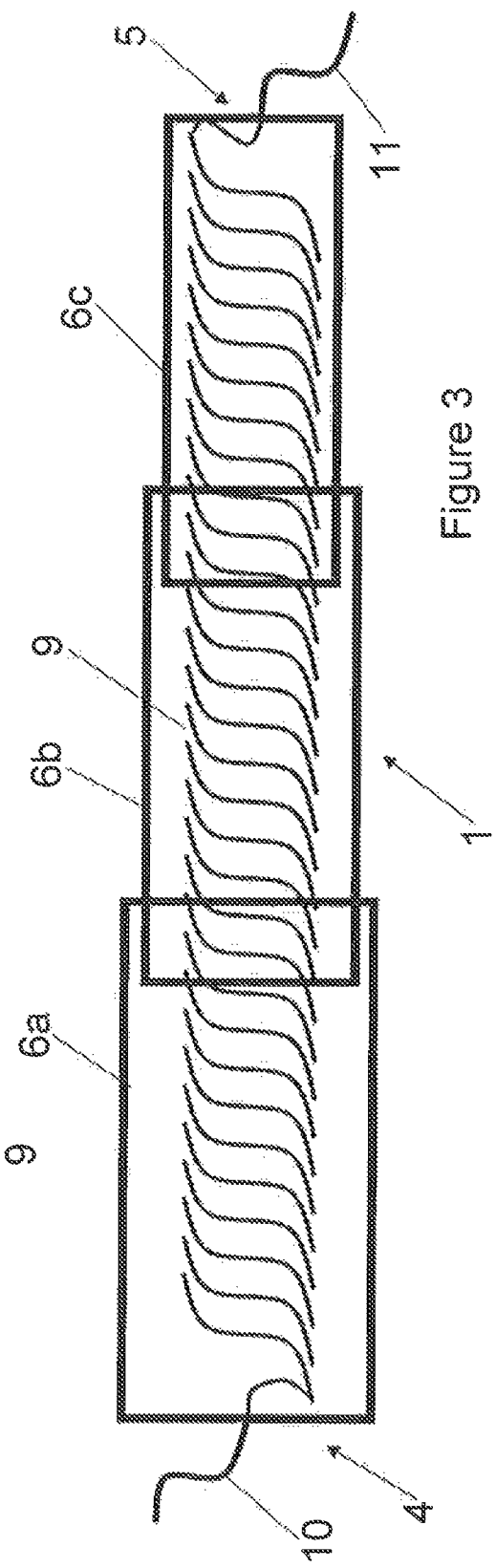

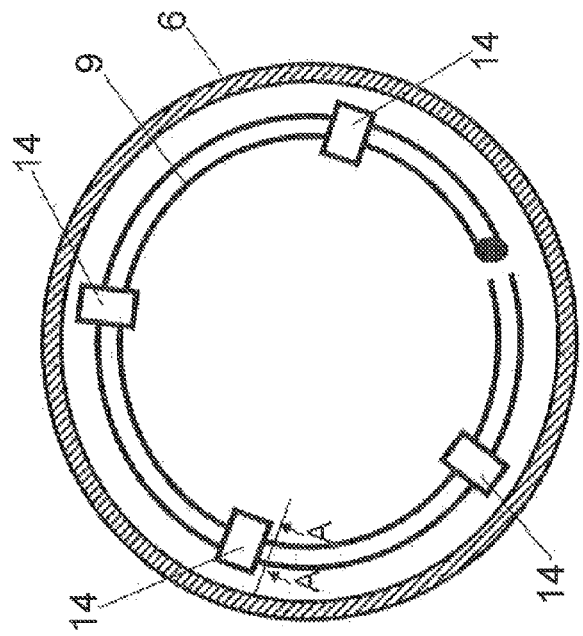
Figure 7
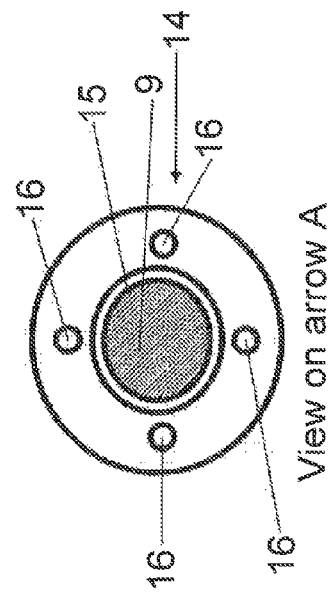
View on arrow A
Figure 8
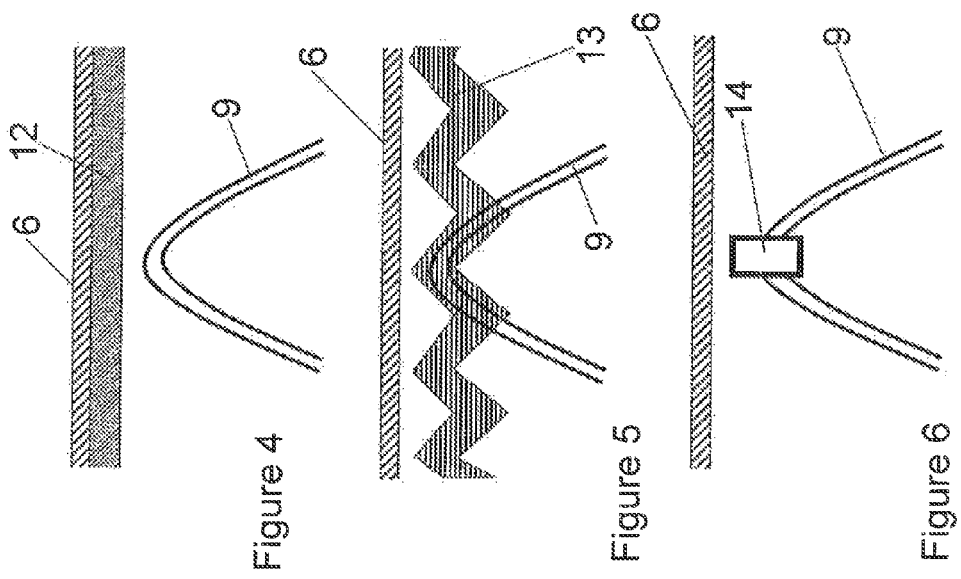
Figure 4
Figure 5
Figure 6

TELESCOPIC STRUT

RELATED APPLICATIONS

The present application is based on, and claims priority from, British Application Number 1009970.3, filed Jun. 15, 2010, the disclosure of which is hereby incorporated by reference herein in its entirety.

FIELD OF THE INVENTION

The present invention relates to a telescopic strut for electrically connecting a fixed structure of an aircraft to a movable structure mounted to the fixed structure.

BACKGROUND OF THE INVENTION

Ice protection of aircraft leading edge structures has traditionally been provided on large commercial aircraft through the use of bleed air. Smaller aircraft have used combinations of inflatable rubber de-icing boots, and de-icing fluid. Helicopters have had significant experience of electrical ice protection solutions. Most previous applications of helicopter electrical ice protection have been on fixed structures, which by definition do not move. The only exception to this being electrical ice protection on helicopter rotor blades where the power is transmitted through a slip ring system of joints, the technology of which is used over much of the engineering industry.

There is now a move to incorporate electrical de-icing systems into commercial fixed wing aircraft. The areas of commercial fixed wing aircraft that have particular need for ice protection are the movable leading edge slat structures.

WO2006/027624A describes a coupling arrangement for coupling services between an aircraft wing fixed aerofoil component and a extendable leading edge slat mounted thereto. The coupling arrangement includes a housing for connection to the fixed aerofoil structure, and a hollow telescopic assembly extendable between a retracted and an extended position. A service carrying conduit arrangement carries the services, such as electrical power cables, between the fixed aerofoil component and the leading edge slat, and extends through the hollow telescopic assembly. The service carrying conduit arrangement is flexible and excess thereof is located within the housing when the telescopic assembly is in the retracted position. The housing for storing the excess of the flexible conduit carries an undesirable weight and space penalty.

SUMMARY OF THE INVENTION

A first aspect of the invention provides a telescopic strut for electrically connecting a fixed structure of an aircraft to a movable structure mounted to the fixed structure, wherein the strut is adapted to be mechanically connected to the fixed structure by its one end and to be mechanically connected to the movable structure by its opposite end, the strut comprising a plurality of telescopic elements and containing a helically coiled electrical cable, wherein the cable is adapted to move between retracted and extended positions with the telescoping of the strut.

A further aspect of the invention provides a method of operating an aircraft having a movable structure mounted to a fixed structure, and a telescopic strut mechanically and electrically connected between the fixed and movable structures, wherein the strut comprises a plurality of telescopic elements and contains at least one helically coiled electrical cable, the method comprising moving the movable structure between retracted and extended positions accompanied by corresponding telescoping, of the strut and movement of the coiled cable between retracted and extended positions to maintain electrical connection between the fixed and movable structures.

The invention is advantageous in that when the strut is in its retracted position, excess cabling is stored within the strut and therefore does not require any additional housing for storing the excess cabling. This saves significant space and weight.

The cable may be pre-sprung so as to be biased to its retracted position. This may be achieved by pre-forming a flexible insulator of the cable to a naturally retracted state, that can extend by elastic deformation. Alternatively, a helical spring may be attached to the cable biased to a retracted position.

The cable may need to be electrically segregated from strut. A dielectric material may therefore be provided between the cable and the strut. The dielectric material may maintain a desired clearance between the cable and the strut. For example, if a high tension cable is contained within metallic, conductive telescopic elements the desired clearance may be at least approximately 10 mm.

The dielectric material may be a flexible liner inside the strut. The liner may be convoluted. The convoluted liner can concertina like a bellows as the strut moves between its extended and retracted positions. The convoluted liner may extend from one end of the strut to the opposite end. The cable may be embedded in the liner. Alternatively, the liner may be of substantially uniform thickness and formed in several sections, each fixed to the inside of a respective strut element.

The dielectric material may additionally or alternatively be one or more grommets around the cable. The grommets may each have a central hole through which the cable passes. The grommets may be positioned at angularly spaced locations along the helically coiled cable. The arommets may include additional holes to provide a damping effect to improve vibration protection for the cable.

The cable may be a power cable and/or a sensor cable. One or more cables may be provided in the strut.

An electrical connection terminal may be provided at each end of the strut. The connection terminal may be used to connect a mating connection terminal on each of the fixed and movable structures. The connection terminals may be electrically connected to each end of the cable.

In one embodiment, an aircraft comprises a fixed structure, a movable structure mounted to the fixed structure, and a telescopic strut in accordance with this invention mechanically connected to the fixed structure by its one end and mechanically connected to the movable structure by its opposite end.

The fixed structure may be a fixed aerofoil and the movable structure may be a flight control surface. In particular, the flight control surface may be a wing leading edge slat.

A wireless or optical sensor line may additionally be provided between the fixed and movable structures. The sensor line may form part of a control system for one or more devices mounted in/on the movable structure which are supplied with electrical power by the strut.

A plurality of the telescopic struts may be provided between the fixed and movable structures. For example, one strut may convey a power cable and another a sensor cable. Alternatively, several struts, each conveying one or more power and/or sensor cables may be used.

BRIEF DESCRIPTION OF THE DRAWINGS

Embodiments of the invention will now be described with reference to the accompanying drawings, in which:

FIG. 2 illustrates the telescopic strut in its retracted position;

FIG. 3 illustrates the telescopic strut in its extended position;

FIG. 4 illustrates a partial section view showing a first example of a dielectric liner on the inside wall of one of the telescopic strut elements;

FIG. 5 illustrates a partial section view showing a second example of a dielectric liner inside the telescopic strut;

FIG. 6 illustrates a partial section view showing a third example of a dielectric grommet around the cable inside the telescopic strut;

FIG. 7 illustrates a section view showing an array of the grommets spaced along the cable; and FIG. 8 illustrates the view on arrow A in FIG. 7 showing the grommet around the cable in detail.

DETAILED DESCRIPTION OF EMBODIMENT(S)

Figure 1:
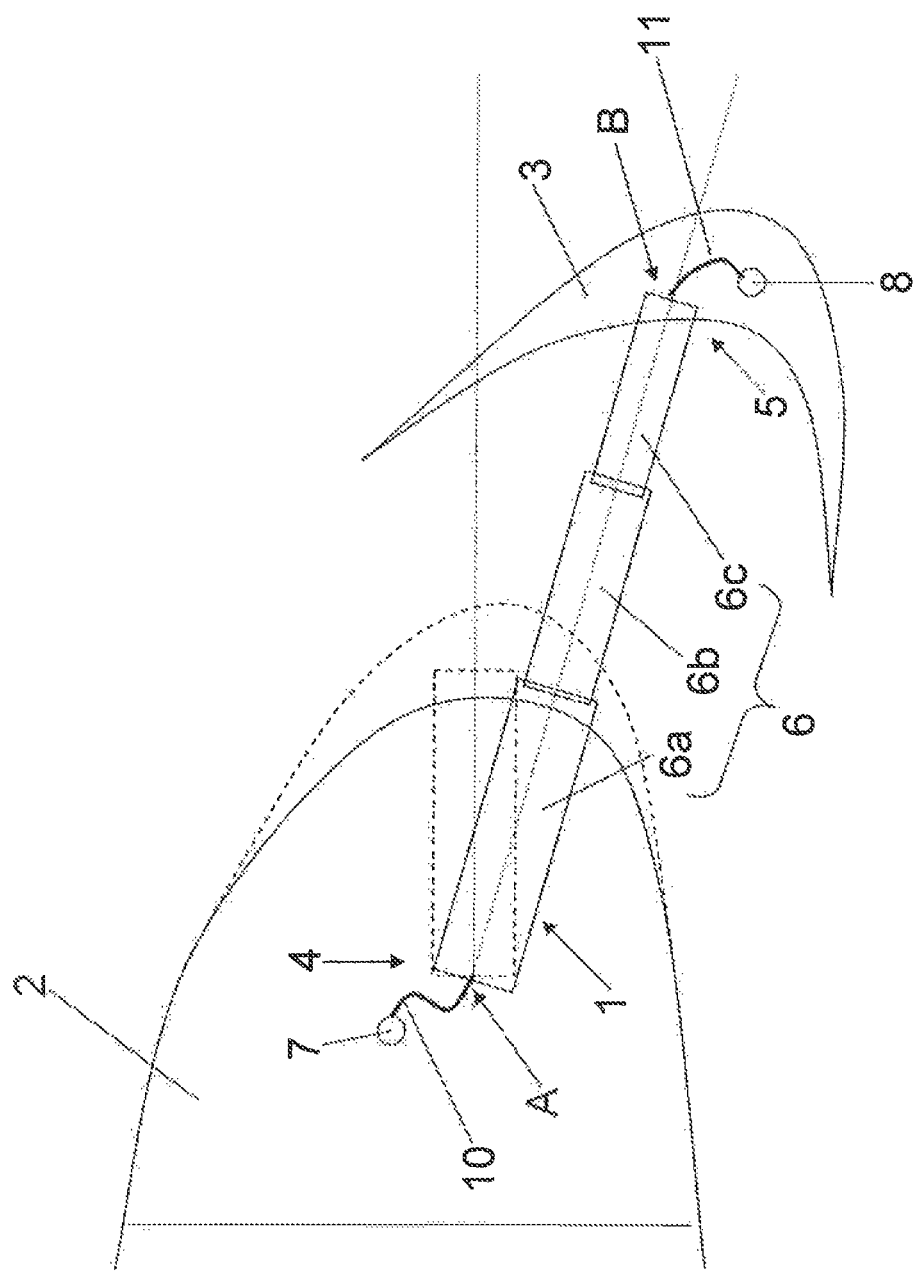
FIG. 1 illustrates a telescopic strut mounted between fixed and movable structures of an aircraft.

FIG. 1 illustrates a telescopic electrically connecting strut 1 in both its retracted position (shown in broken line) and its extended position (full line), in FIG. 1, the telescopic strut electrically connects between a fixed structure 2 and a movable structure 3 of an aircraft. In this example, the structure 2 is a fixed main wing structure and the structure 3 is a leading edge slat (or flap).

The telescopic strut 1 has a first end 4 attached to the fixed structure 2 and a second end 5, opposite the first, attached to the movable structure 3. In the particular example shown in FIG. 1, the telescopic strut 1 is pivotally connected to the fixed structure 2 at a pivot point A, and is pivotally connected to the movable structure at pivot point B. The telescopic strut 1 comprises several hollow tubular elements 6. In the particular example shown these elements 6 number three and are referenced as 6a, 6h, 6c. Each element 6 fits within one another in a sliding fashion, with the largest element 6a preferably being that attached to the fixed structure 2.

The movable structure 3 is translated between retracted and extended positions with respect to the fixed structure 2 by further mechanical actuators, not illustrated, in a conventional manner. At each end 4, 5 of the telescopic strut 1 is a respective electrical connection terminal 7, 8. The electrical connection terminal 7 is connected to an electrical path (not shown) within the fixed structure 2, and the electrical connection terminal 8 is connected to an electrical device (not shown) within the movable structure 3. The electrical device may be, for example, an electrical heating device for de-icing purposes or one or more items of electronic apparatus. The telescopic strut 1 provides the communication of electrical power and/or communication signals between the fixed structure 2 and the movable structure 3, as explained more clearly with reference to FIGS. 2 and 3.

FIG. 2 illustrates the telescopic strut 1 of FIG. 1 in greater detail and in cross-section, with the strut 1 in its retracted position. In this example, the strut 1 includes three cylindrical, hollow tubular telescopic elements 6a, 6b and 6e. These elements 6 are arranged to slidably fit one with the other, i.e, such that the smallest diameter telescopic element 6c is slidably received within telescopic element 6b, which in turn is slidably received within the telescopic element 6a. It will of course be appreciated that more or less telescopic elements 6 may be provided as required and other geometries apart from cylindrical tubes may be adopted, if desired.

Contained within the telescopic elements 6 is a helically coded electrical cable 9. The cable 9 has a cod diameter slightly less than the inner diameter of the smallest telescopic element 6c. At the first end 4 of the strut 1, the cable 9 is electrically connected to a wiring path 10 for connection to the terminal 7. At the second end 5 of the strut 1, the cable 9 is electrically connected to a wiring path 11 for connection to the terminal 8.

FIG. 3 illustrates the strut 1 in its extended position, and shows how the helically coiled cable 9 increases its effective length with extension of the strut 1. A space between adjacent windings of the coil increases, and is accompanied by a slight decrease in diameter of the coil, as the effective length of the cable 9 increases. The effective length of the cable may approximately double as the strut 1 moves from its retracted to its extended position.

In this example, the cable 9 has a bundle of wires encased in insulating material that is "pre-sprung" to a retracted state. The coiled cable 9 elastically deforms from its retracted to its extended state such that it is biased to its retracted state. In this way the cable 9 naturally returns to its retracted state as the strut 1 telescopes from its extended to its retracted position. If the insulating material alone is insufficient to cause the retraction of the coiled cable 9, a helical spring (not shown) may be wound with or into the cable 9 to assist with the retraction.

The strut elements 6 may be made of metallic or plastics (e.g. fibre reinforced composite) material. Where non-conductive material is used for the strut elements 6 then sufficient electrical segregation may be achieved between the cable 9 and the strut elements 6 without additional dielectric material. However, particularly in the case of conductive, metallic strut elements 6, dielectric material may need to be provided between the cable 9 and the strut elements 6 to provide the required electrical segregation.

FIG. 4 illustrates a partial cross section view through the strut in accordance with a second example, where a dielectric liner 12 is provided on the inner wall of the strut element 6. The liner 12 may be bonded or otherwise attached to the inside of the strut element 6. The liner 12 may be made of PTFE or PEEK, for example. A length of liner material may be attached on the inside of each strut element. The liner 12 provides a segregation distance between the cable 9 and the strut element 6. However, the liner 12 increases the wall thickness of the strut element 6 and so the smaller diameter strut elements db, 6c will need to be of reduced diameter compared to the first example above so as to slide one within the other. This in turn reduces the maximum coil diameter of the cable 9 that can fit within the smallest strut element 6c. This is undesirable as it limits the amount to which the effective length of the cable can be altered, and could result in an undesirable gap between the cable 9 and the inner wall of the largest strut element 6a. A cable harness (not shown) may be used to restrain the cable 9 from deflecting into this gap so as to prevent premature cable wear when the strut 1 is subjected to vibration loads.

FIG. 5 illustrates a partial cross section view through the strut in accordance with a third example, wherein the cable 9 is embedded in a convoluted dielectric "sock" 13. The sock 13 extends the entire length of the strut 1 inside the strut elements 6. The convoluted design of the sock 13 enables the sock to extend and retract with the strut 1, as it functions like a bellows element. Since the wall thickness of the strut elements 6 is unchanged from the first example described above, the diameter of the respective strut elements 6 may also be unchanged. Accordingly, the undesirable gap present in the second example above is avoided. The helically coiled cable 9 is embedded within the convolutions of the sock 13. The sock 13 may be formed of elastomeric material which may additionally assist with the retraction of the cable 9.

FIG. 6 illustrates a partial cross section view through the strut in accordance with a third example, wherein the cable 9 passes through a grommet 14. The grommet 14 is made of elastomeric material and helps to maintain electrical segregation between the cable 9 and the inner wall of the strut element 6, and also provides some cushioning for the cable against vibration loads. As shown in FIG. 7, several grommets 14 may be provided spaced circumferentially along the length of the coiled cable 9. The grommets 14 also provide spacing between adjacent windings of the retracted coiled cable 9, which provides inductance protection. This is particularly beneficial if a large diameter high tension cable 9 is used. For example, the cable 9 may be at least 10 mom in diameter. FIG. 8 shows one of the grommets 14 in detail with the cable 9 passing through it. The grommet 14 has a central aperture 15 through which the cable 9 passes, and also has several smaller through holes 16. The holes 16 provide additional damping protection for the cable 9 against impact with the strut element 6. Although a circular grommet is shown in FIGS. 6 to 8, the grommet may take many different shapes, such as square or rectangular, for example.

As mentioned previously, the telescopic strut 1 may be used to communicated electrical power and/or communication signals between the fixed structure 2 and the movable structure 3. A wireless or optical sensor line (not shown) may additionally be provided between the fixed structure 2 and the movable structure 3. The sensor line may form part of a control system for one or more electrical devices mounted in or on the movable structure 3 which are supplied with electrical power by the strut 1.

A plurality of the telescopic struts 1 may be provided between the fixed structure 2 and movable structure 3. For example, one telescopic strut may convey a power cable and another a sensor cable. Alternatively, several struts, each conveying one or more power and/or sensor cables may be used.

Although the invention has been described above with reference to one or more preferred embodiments, it will be appreciated that various changes or modifications may be made without departing from the scope of the invention as defined in the appended claims.

The invention claimed is:

1. A telescopic strut electrically connecting a fixed structure of an aircraft that is an airfoil of the aircraft to a movable structure that is a flight control surface mounted to the fixed structure, wherein the strut is mechanically connected to the fixed structure by its one end and mechanically connected to the movable structure by its opposite end, the strut comprising a plurality of telescopic elements and containing a helically coiled electrical cable for an electrical de-icing system, wherein the cable is adapted to move between retracted and extended positions with the telescoping of the strut.

2. A telescopic strut according to claim 1, wherein the cable is pre-sprung so as to be biased to its retracted position.

3. A telescopic strut according to claim 1, further comprising a dielectric material between the strut and the cable.

4. A telescopic strut according to claim 3, wherein the dielectric material includes a flexible liner inside the strut.

5. A telescopic strut according to claim 4, wherein the liner is corrugated.

6. A telescopic strut according to claim 4, wherein the cable is embedded in the liner.

7. A telescopic strut according to claim 3, wherein the dielectric material includes one or more grommets around the cable.

8. A telescopic strut according to claim 3, wherein the dielectric material is adapted to electrically segregate the cable from the strut.

9. A telescopic strut according to claim 3, wherein the dielectric material is attached to inner surfaces of each of the telescopic elements.

10. A telescopic strut according to claim 9, wherein the one or more grommets are adapted to remain substantially fixed with respect to the cable as the cable moves between the retracted and extended positions.

11. A telescopic strut according to claim 9, wherein the one or more grommets are adapted to move freely with respect to the telescoping elements of the strut as the cable moves between the retracted and extended positions.

12. A telescopic strut according to claim 7, wherein the one or more grommets are mounted to the cable.

13. A telescopic strut according to claim 7, wherein the one or more grommets each comprise a central aperture through which the cable passes and one or more additional holes providing damping protection for the cable.

14. A telescopic strut according to claim 1, wherein the cable is a power cable and/or a sensor cable.

15. A telescopic strut according to claim 1, including a plurality of the cables.

16. A telescopic strut according to claim 1, further comprising an electrical connection terminal at each end of the strut.

17. An aircraft comprising a fixed structure, a movable structure mounted to the fixed structure, and a telescopic strut in accordance with claim 1 mechanically connected to the fixed structure by its one end and mechanically connected to the movable structure by its opposite end.

18. An aircraft according to claim 17, further comprising a wireless or optical sensor line between the fixed and movable structures.

19. A telescopic strut according to claim 1, wherein the helically coiled cable is helically coiled for substantially all of its length inside the telescopic elements.

20. A telescopic strut according to claim 1, wherein the helically coiled cable is helically coiled for all of its length inside the telescopic elements.

21. A telescopic strut according to claim 1, wherein the helically coiled cable is helically coiled for substantially all of its length in both a fully retracted position and a fully extended position.

22. A telescopic strut according to claim 1, wherein the helically coiled cable is helically coiled for all of its length in both a fully retracted position and a fully extended position.

23. A telescopic strut according to claim 1, wherein the strut is configured such that a total amount of cable inside an enclosed volume established by the telescopic elements is the same when the cable is at a fully retracted position as it is when the cable is at a fully extended position.

24. A method of operating an aircraft having a movable structure that is a flight control surface mounted to a fixed structure of an aircraft that is an airfoil of the aircraft, and a telescopic strut mechanically and electrically connected between the fixed and to a movable structures, wherein the strut comprises a plurality of telescopic elements and contains at least one helically coiled electrical cable for an electrical de-icing system, the method comprising moving the movable structure between retracted and extended positions accompanied by corresponding telescoping of the strut and movement of the coiled cable between retracted and extended positions to maintain electrical connection between the fixed and movable structures.

25. The method of claim 24, wherein the coiled cable is coiled for substantially all of its length throughout movement between the retracted and extended positions, wherein the retracted position is a fully retracted position and the extended position is a fully extended position.

26. The method of claim 24, wherein the coiled cable is coiled for all of its length throughout movement between the retracted and extended positions, wherein the retracted position is a fully retracted position and the extended position is a fully extended position.

27. The method of claim 24, wherein the amount of cable inside an enclosed volume established by the telescopic elements is the same throughout movement between the retracted and extended positions, wherein the retracted position is a fully retracted position and the extended position is a fully extended position.

* * * * *